(12) United States Patent
Frey

(10) Patent No.: US 8,461,481 B2
(45) Date of Patent: Jun. 11, 2013

(54) METHODS AND APPARATUS FOR REDUCING VARIATIONS IN THE LASER INTENSITY DURING SCRIBING A PHOTOVOLTAIC DEVICE

(75) Inventor: Jonathan Mack Frey, Denver, CO (US)

(73) Assignee: Primestar Solar, Inc., Arvada, CO (US)

( * ) Notice: Subject to any disclaimer, the term of this patent is extended or adjusted under 35 U.S.C. 154(b) by 16 days.

(21) Appl. No.: 13/089,825

(22) Filed: Apr. 19, 2011

(65) Prior Publication Data
US 2012/0024830 A1 Feb. 2, 2012

(51) Int. Cl.
*B23K 26/38* (2006.01)
*B23K 26/06* (2006.01)
*G02B 27/48* (2006.01)
*G02B 6/00* (2006.01)

(52) U.S. Cl.
USPC ............... 219/121.69; 219/121.73; 385/134

(58) Field of Classification Search
USPC ........ 219/121.68, 121.69, 121.73; 359/196.1, 359/197.1, 205.1; 385/134
See application file for complete search history.

(56) References Cited

U.S. PATENT DOCUMENTS

| | | | | |
|---|---|---|---|---|
| 4,011,403 | A | * | 3/1977 | Epstein et al. ............ 385/901 |
| 5,790,724 | A | * | 8/1998 | Neuberger et al. .......... 385/31 |
| 6,018,413 | A | * | 1/2000 | Oka .......................... 359/326 |
| 6,421,390 | B1 | | 7/2002 | Burkhart |
| 6,621,613 | B2 | | 9/2003 | Silberberg et al. |
| 6,882,456 | B2 | | 4/2005 | Mansbridge |
| 7,057,788 | B2 | | 6/2006 | Ohbayashi et al. |
| 7,105,811 | B2 | | 9/2006 | Dantus et al. |
| 7,209,279 | B2 | | 4/2007 | Igasaki et al. |
| 7,219,017 | B2 | | 5/2007 | Vitaliano et al. |
| 7,230,715 | B2 | | 6/2007 | Li |
| 7,439,497 | B2 | | 10/2008 | Dantus et al. |
| 7,450,618 | B2 | | 11/2008 | Dantus et al. |
| 7,486,704 | B2 | | 2/2009 | Kaplan et al. |
| 7,567,596 | B2 | | 7/2009 | Dantus et al. |
| 7,583,710 | B2 | | 9/2009 | Dantus et al. |
| 7,609,731 | B2 | | 10/2009 | Dantus et al. |
| 8,253,065 | B2 | * | 8/2012 | Zhang et al. .............. 219/121.68 |

(Continued)

FOREIGN PATENT DOCUMENTS

JP 2003-156698 A * 5/2003
JP 2004-354671 A * 12/2004

OTHER PUBLICATIONS

Machine translation of Japan Patent document No. 2003-156,698, Aug. 2012.*

(Continued)

*Primary Examiner* — Geoffrey S Evans
(74) *Attorney, Agent, or Firm* — Dority & Manning, P.A.

(57) ABSTRACT

Methods are generally provided of reducing speckle of a laser beam from a laser source guided through an optical waveguide. The method includes vibrating an optical waveguide at a first point along the optical waveguide at a first frequency (e.g., having a range of about 20 kHz to about 20 GHz) for a certain distance (e.g., a distance of about 0.1 mm to about 5 cm), and directing the laser beam out of the optical waveguide from the laser source to a target. Such methods are particularly useful for scribing a thin film layer on a photovoltaic module (e.g., a cadmium telluride-based thin film photovoltaic device). Fiber optic laser systems are also generally provided for reducing speckle of a laser beam from a laser source guided through an optical waveguide.

17 Claims, 6 Drawing Sheets

U.S. PATENT DOCUMENTS

| | | | |
|---|---|---|---|
| 8,278,590 B2 * | 10/2012 | Hall et al. | 219/121.69 |
| 2002/0074318 A1 * | 6/2002 | Vogt et al. | 219/121.67 |
| 2004/0009620 A1 | 1/2004 | Saito et al. | |
| 2004/0021926 A1 | 2/2004 | Mansbridge | |
| 2006/0119855 A1 | 6/2006 | Li | |
| 2009/0122819 A1 | 5/2009 | Dantus et al. | |
| 2009/0245301 A1 | 10/2009 | Peng et al. | |
| 2009/0323741 A1 | 12/2009 | Deladurantaye et al. | |
| 2010/0079848 A1 * | 4/2010 | Grasser et al. | 359/291 |
| 2010/0252543 A1 * | 10/2010 | Manens et al. | 219/121.69 |

OTHER PUBLICATIONS

Machine translation of Japan Patent document No. 2004-354,671, Aug. 2012.*

Ha et al., "Speckle reduction in multimode fiber with a piezoelectric transducer in radial vibration for fiber laser marking and display applications",Dec. 2008, Proceedings of SPIE, vol. 6873, pp. 68731V-1 to 6873V1-8.*

* cited by examiner

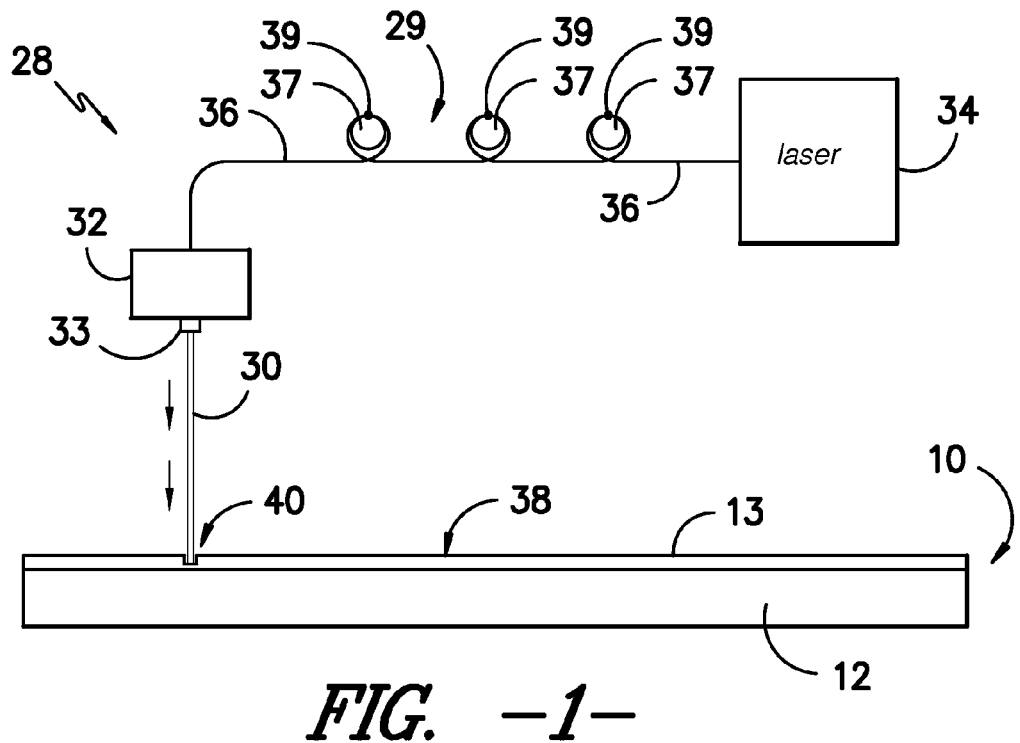
FIG. -1-
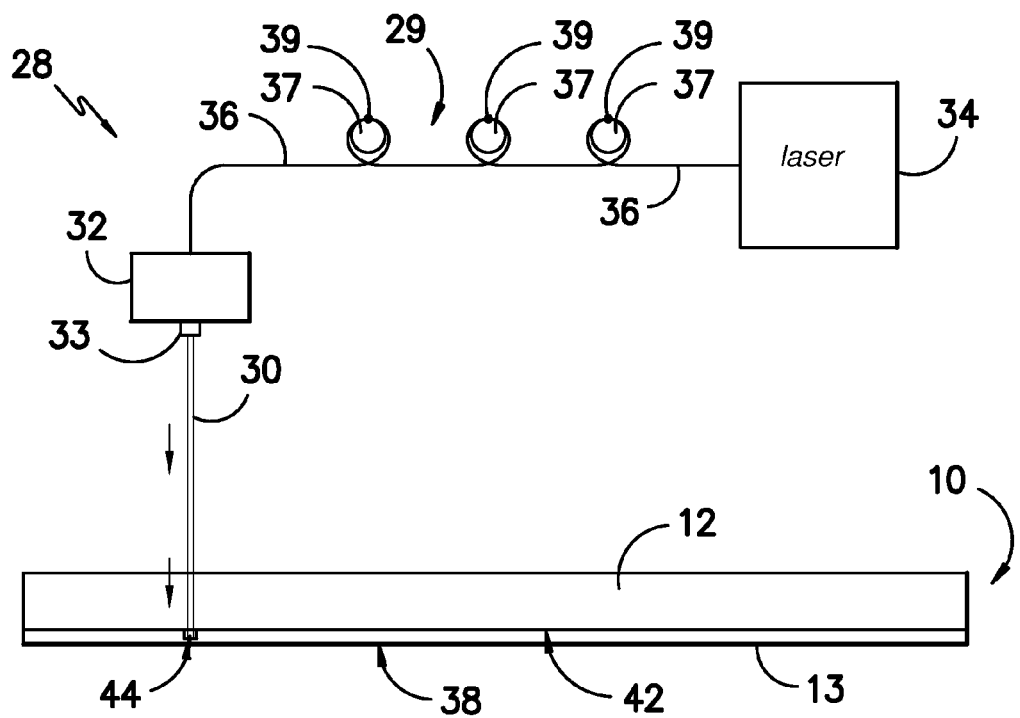
FIG. -2-

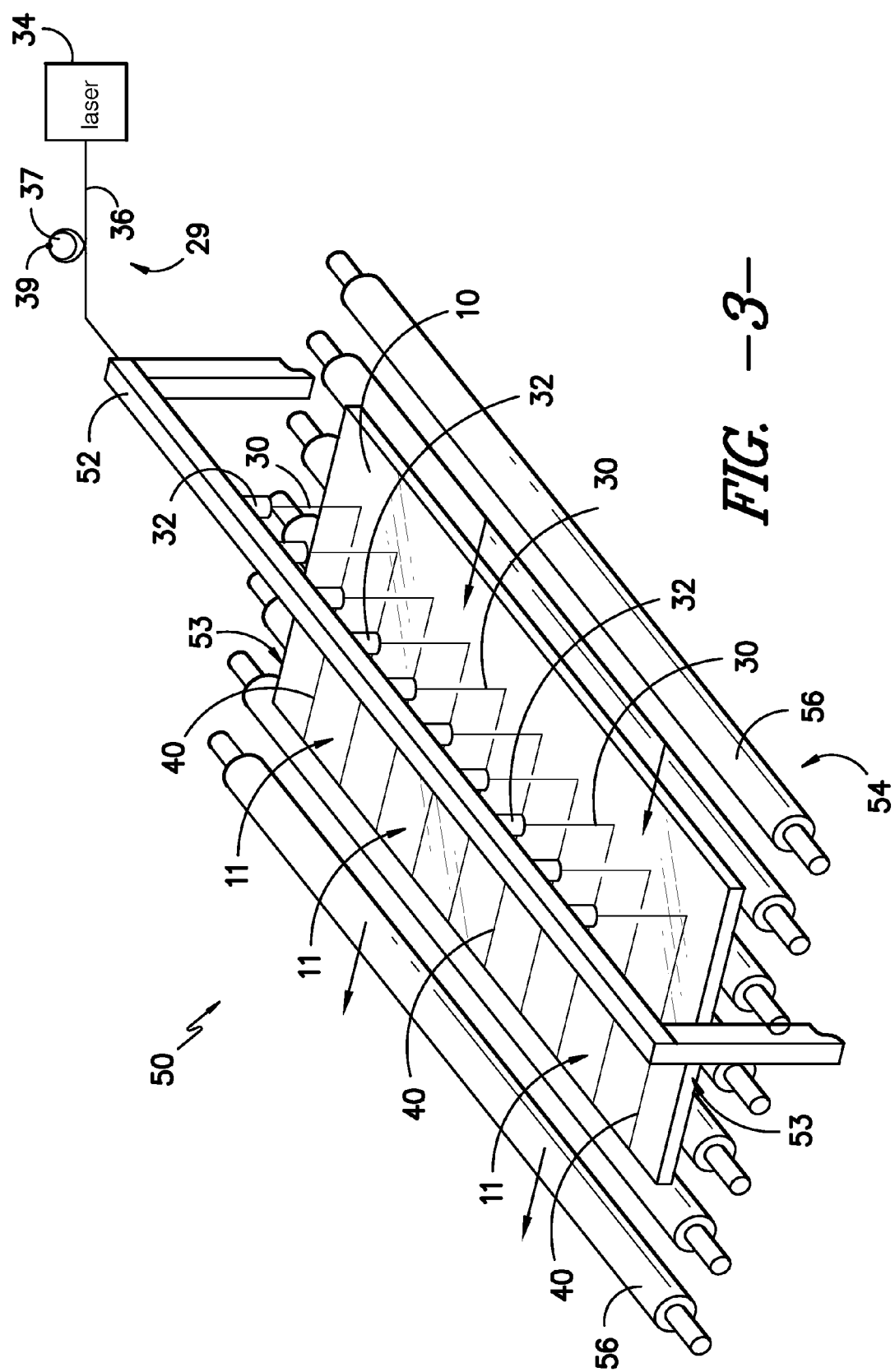
FIG. -3-

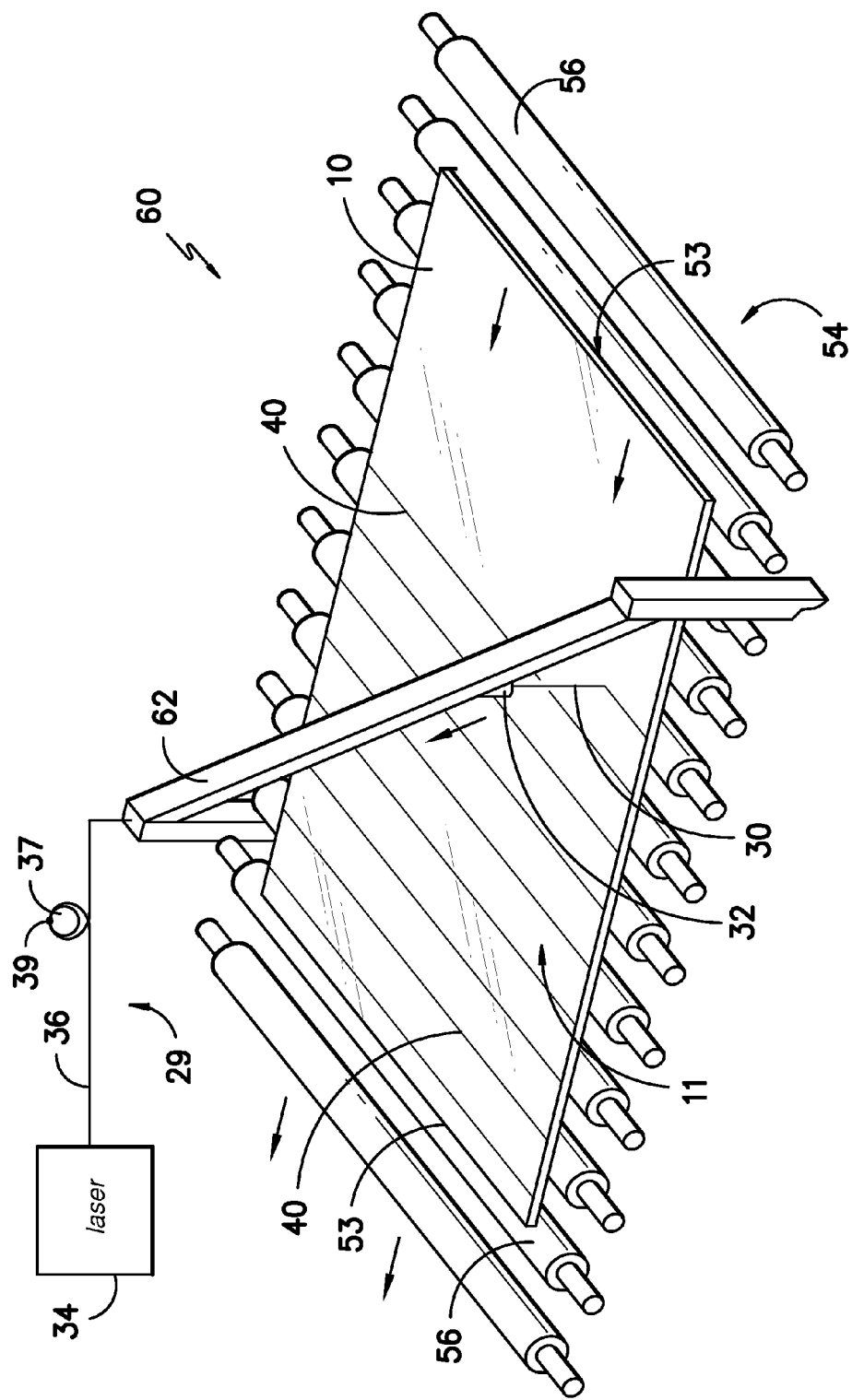
FIG. -4-

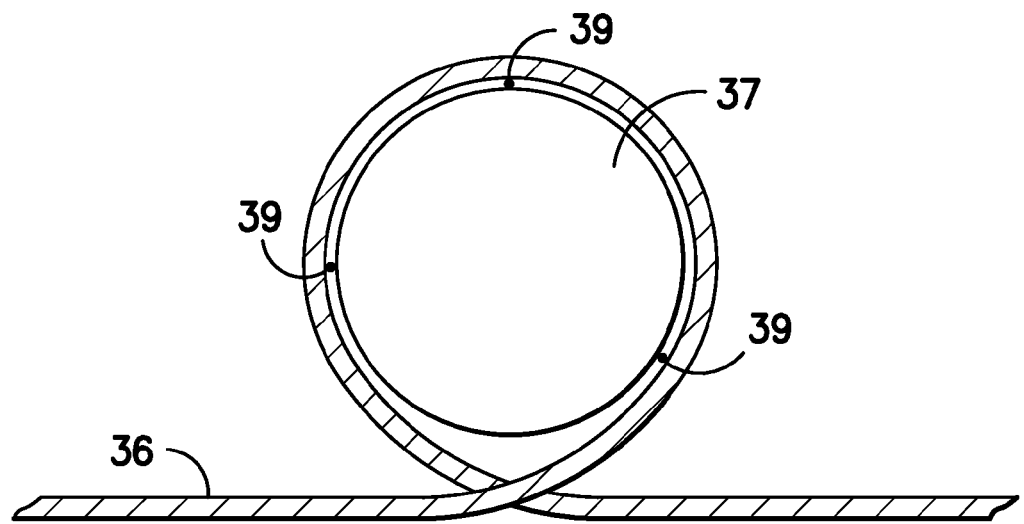
FIG. -5-
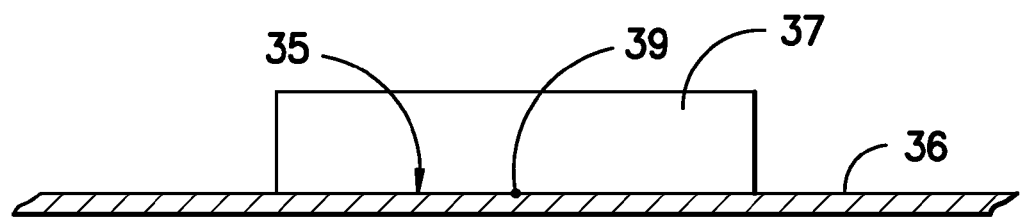
FIG. -6-

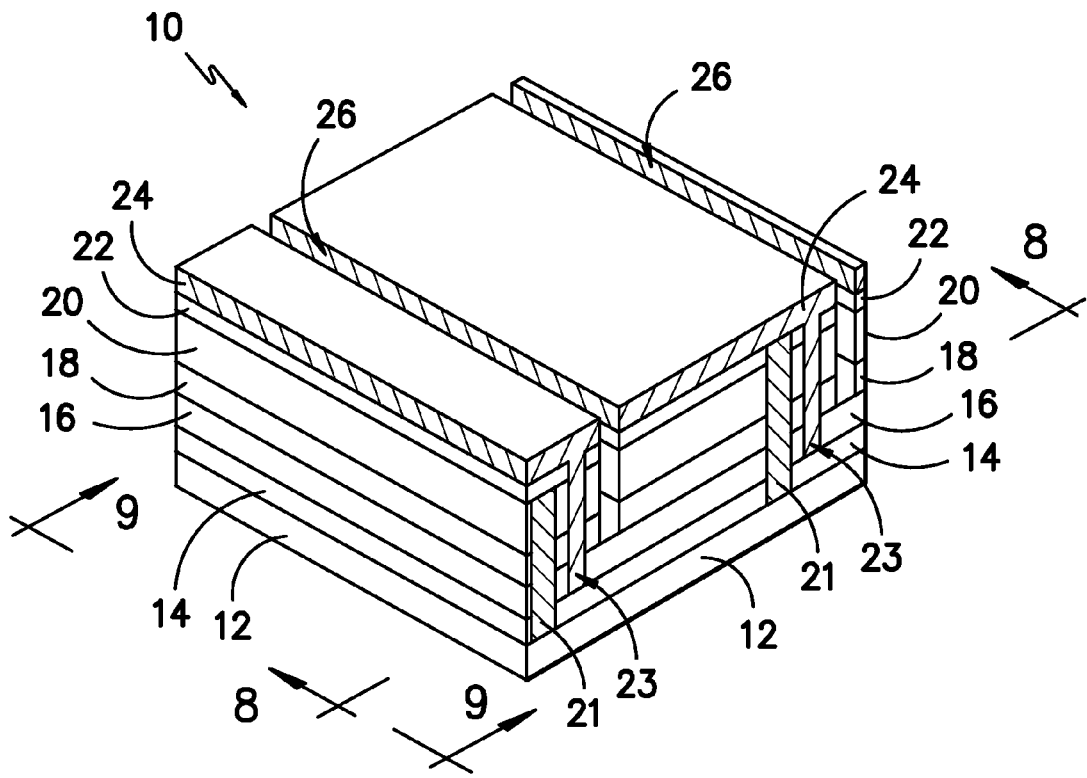
FIG. -7-
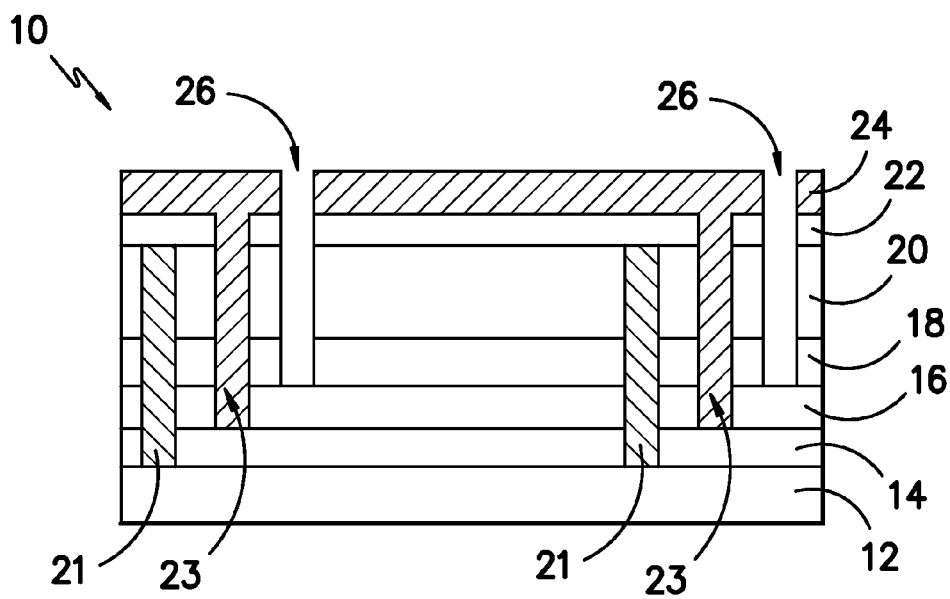
FIG. -8-

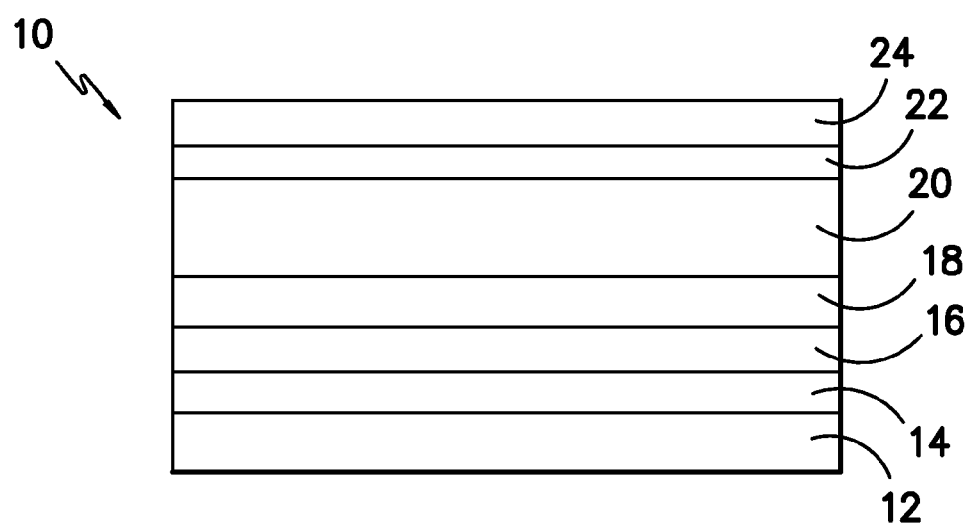
FIG. -9-

METHODS AND APPARATUS FOR REDUCING VARIATIONS IN THE LASER INTENSITY DURING SCRIBING A PHOTOVOLTAIC DEVICE

FIELD OF THE INVENTION

The subject matter disclosed herein relates generally to the field of laser scribing a photovoltaic module to form individual cells in the module. More particularly, the subject matter is related to methods and apparatus for reducing speckle of the laser intensity during scribing a cadmium telluride-based thin film photovoltaic (PV) device.

BACKGROUND OF THE INVENTION

Speckle is intensity non-uniformity, characterized as spikes and/or dips, within the output of a laser (or other light source) guided through a multimode optical waveguide, such as an optical fiber. Speckle is generally caused due to the interference between the many modes of the multimode optical waveguide.

During laser scribing of thin film materials, optical waveguides, such as an optical fiber, can be used to spatially and/or temporarily condition a laser pulse prior to being used for micromachining the thin films. However, speckle induced from such waveguides can cause significant, localized variations in laser intensity during the laser scribing. In particular, speckle induced in the final spot of the laser scribing can result in significant variations in the micromachined or scribed thin films. Thus, speckle can lead to depth variations of the laser scribe in the thin films.

As such, a need exists for reducing the influence of speckle on a laser spot delivered through an optical wave guide, particularly in the field of laser scribing thin films (e.g., in the formation of photovoltaic modules).

BRIEF DESCRIPTION OF THE INVENTION

Aspects and advantages of the invention will be set forth in part in the following description, or may be obvious from the description, or may be learned through practice of the invention.

Methods are generally provided of reducing speckle of a laser beam from a laser source guided through an optical waveguide. The method includes vibrating an optical waveguide at a first point along the optical waveguide at a first frequency (e.g., having a range of about 20 kHz to about 20 GHz), and directing the laser beam out of the optical waveguide from the laser source to a target. Such methods are particularly useful for scribing a thin film layer on a photovoltaic module (e.g., a cadmium telluride-based thin film photovoltaic device).

Fiber optic laser systems are also generally provided for reducing speckle of a laser beam from a laser source guided through an optical waveguide. The system can include a laser transmitter, an optical waveguide operably attached to the laser transmitter, a first vibrating element attached to a first point of the optical waveguide, an optical receiver operably attached to the optical waveguide, and a lens operably attached to the optical receiver and configured to focus a laser beam onto a target.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 shows an exemplary system for laser scribing thin films on a photovoltaic device;

FIG. 2 shows another exemplary system for laser scribing thin films on a photovoltaic device;

FIG. 3 shows an exemplary apparatus for simultaneously forming multiple scribe lines thin films on a photovoltaic device;

FIG. 4 shows another exemplary apparatus for forming multiple scribe lines on thin films on a photovoltaic device;

FIG. 5 shows a close-up view of an optical waveguide wrapped around a vibrating element according to one particular embodiment;

FIG. 6 shows a close-up view of an optical waveguide attached to a vibrating element according to another embodiment;

FIG. 7 shows a perspective view of an exemplary cadmium telluride thin film photovoltaic device;

FIG. 8 shows a general schematic of a cross-sectional view of the exemplary cadmium telluride thin film photovoltaic device of FIG. 7; and, FIG. 9 shows a general schematic of a cross-sectional view perpendicular to the view shown in FIG. 8 of the exemplary cadmium telluride thin film photovoltaic device according to FIG. 7.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer. Additionally, although the invention is not limited to any particular film thickness, the term "thin" describing any film layers of the photovoltaic device generally refers to the film layer having a thickness less than about 10 micrometers ("microns" or "μm").

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

Methods and apparatus are generally provided for laser scribing a film stack utilizing a fiber optic laser system. Specifically, the fiber optic laser system has improved uniformity of intensity through reduced speckle caused by vibrating the optical waveguide (e.g., an optical fiber) at a desired frequency (e.g., ultrasonic). Introducing these vibrations to the optical waveguide helps to uniformly distribute the laser intensity distribution within the optical waveguide, allowing for the laser beam exiting the fiber optic laser system through its lens to have a reduced speckle (e.g., having a substantially uniform intensity).

FIG. 1 shows an exemplary system 28 and method of scribing a film stack 13 on a substrate 12 of a photovoltaic device 10 by directing a laser beam 30 onto the film stack 13. The laser beam is directed onto the photovoltaic device 10 utilizing a fiber optic laser system 29 that includes a laser transmitter 34, an optical waveguide 36, at least one vibrating element 37, an optical receiver 32, and a lens 33. As shown, the laser beam 30 is first produced in the laser transmitter 34. The laser transmitter 34 is configured to focus the laser beam into the optical waveguide 36, which is operably attached to the laser transmitter 34. Suitable laser transmitters 34 are well known in the art and readily available commercially.

The optical waveguide 36 then carries the laser beam to the optical receiver 32, where the laser beam 30 is focused out of the lens 33 and directed onto the photovoltaic device 10. The optical waveguide 36 is generally a thin, flexible fiber that acts as a waveguide, or "light pipe", to transmit light between the two ends of the fiber (i.e., from the laser transmitter 34 to the optical receiver 32). In one particular embodiment, the optical waveguide 36 has a transparent core surrounded by a transparent cladding material with a lower index of refraction, as known in the art. Light (i.e., the laser beam) is kept in the core by total internal reflection, causing the fiber to act as a waveguide. A non-transparent sleeve is often wrapped about the circumference of the optical fiber. Such optical waveguide 36 are well known in the art and are readily available commercially.

The optical waveguide 36 is attached to at least one vibrating element 37 along at least one point on its length between the laser transmitter 34 and the optical receiver 32. The vibrating element 37 is configured to oscillate at a predetermined frequency and distance. For instance, the vibrating element 37 can oscillate at a frequency of about 20 kHz to about 20 GHz. Without wishing to be bound by any particular theory, it is believed that relatively high frequency vibrations (e.g., about 1 MHz to about 20 GHz) can more readily facilitate mixing of the laser intensity within the optical waveguide 36, providing even more improved reduction of speckle. Furthermore, these relatively high frequency vibrations may be particularly useful when employing a pulsed laser beam 30, since they can allow for at least one vibration to occur during the short time of each pulse (e.g., the vibrating element 37 can still move through two complete vibrations when at a frequency of 20 GHz during a 10 ns pulse of the laser beam 30).

In another embodiment, the vibrating element 37 is an ultrasonic oscillator configured to vibrate at a frequency in the ultrasonic range. For example, the vibrating element 37 can vibrate at a frequency of about 20 kHz to about 500 kHz, which generally corresponds to the ultrasonic frequency range.

The distance that the vibrating element 37 moves the optical waveguide 36 at any giving point along its length is relatively small when compared to the overall length of the optical waveguide 36. For example, the optical waveguide 36 can be vibrated a distance of about 0.1 mm to about 5 cm at a point 39 where the optical waveguide 36 is attached to the vibrating element 37, such as about 0.5 mm to about 1 cm. Of course, the optical waveguide 36 may be bonded at multiple points along its length to the vibrating element 37 to ensure good transference of the ultrasonic energy from the vibrating element 37 to the optical waveguide 36. As shown in the embodiment of FIG. 5, the optical waveguide 36 can be wrapped at least once around the vibrating element 37 such that multiple attachment points 39 are present between the optical waveguide 36 and the vibrating element 37 along the length of the optical waveguide 36. Alternatively, as shown in the embodiment of FIG. 6, the optical waveguide 36 can be attached along a side 35 of the vibrating element 37.

As stated, at least one vibrating element 37 is in contact with the optical waveguide 36 in the fiber optic laser system 29. For example, the embodiments shown in FIGS. 1 and 2 each have three vibrating elements 37 in contact with the optical waveguide 36. Specifically, the optical waveguide 36 is shown wrapped around each vibrating element 37 allowing multiple points 39 of the optical waveguide 36 to remain in contact with the vibrating element 37. However, as stated above, other contact configurations can be utilized as desired.

Although shown with three vibrating elements 37, the fiber optic laser system 29 can include any desired number of vibrating elements 37 contacting the optical waveguide 36. For example, the fiber optic laser system 29 can include a single vibrating element 37 or a plurality (i.e., more than one) of vibrating elements 37 in contact with the optical waveguide 36. Without wishing to be bound by any particular theory, it is believed that utilizing multiple vibrating elements 37 along the length of the optical waveguide 36 can more readily facilitate mixing of the laser intensity within the optical waveguide 36, providing even more improved reduction of speckle. When more than one vibrating element 37 is present along the vibrating element 37, the individual vibrating elements 37 can be operated at the same frequency or different frequencies.

The optical waveguide 36 can be made in contact with the vibrating element 37 according to any method. For example, as shown in FIG. 5, when wrapped around the circumference of the vibrating element 37, the optical waveguide 36 need not be attached if sufficient tautness exists in the optical waveguide 36 to keep at least one contact point 39 between the optical waveguide 36 and the vibrating element 37 during use. However, in certain embodiments, it may be desirable to use an attachment mechanism to secure the optical waveguide 36 to the vibrating element 37 in at least one contact point 39. For example, the optical waveguide 36 can be bonded, adhered, clipped, or otherwise secured to the vibrating element 37 in at least one contact point 39. Additionally, the optical waveguide 36 can be bonded, adhered, clipped, or otherwise secured to the vibrating element 37 more than one contact points 39, as shown in FIG. 5.

As shown in FIG. 1, the laser beam 30 is directly applied onto an exposed surface 38 of the film stack 13 to form a scribe line 40. FIG. 2 shows an alternative embodiment to the system 28 and method of FIG. 1, where the laser beam 30 passes through the glass substrate 12 to form a scribe line 44 on the inner surface 42 of the film stack 13 adjacent to the substrate 12. As stated, the depth of the scribe lines 40, 44 into the thickness of the film stack 13 can be adjusted according to the laser beam's intensity (as a function of the total power and pulse cycle $T_{pc}$).

The laser transmitter 32 can be any suitable laser device that emits light (i.e., electromagnetic radiation) through optical amplification based on the stimulated emission of photon, as known in the art. The wavelength of the laser beam 30 can be adjusted as desired and can be monochromatic or multichromatic in wavelength and/or can have a power level that is substantially constant or varying as a function of time. For example, the wavelength of the laser beam 30 can be in a range of about 250 nm to about 1150 nm. Suitable monochromatic wavelengths of the laser beam 30 include, but are not limited to, about 266 nm, about 355 nm, about 532 nm, and about 1064 nm.

Additionally, the laser beam 30 can be focused through a lens 33 in the optical receiver 32 to control the diameter of the laser beam 30, according to the desired size of the scribe lines 40 formed in the photovoltaic module 10. For example, the diameter of the laser beam 30 can be about 10 μm to about 500 μm in certain embodiments. The laser beam 30 may be a continuous beam or pulsed beam, as desired. For instance, the laser beam 30 may be pulsed in a cycle that spans about 0.1 nanoseconds (ns) to about 500 ns, such as about 0.5 ns to about 250 ns. In particular embodiment, the pulse can last about 1 ns to about 100 ns, such as about 5 ns to about 50 ns.

FIG. 3 shows an exemplary system 50 and method of simultaneously forming multiple scribe lines 40 in a photovoltaic device 10. A plurality of optical receivers 32 are positioned along the frame 52. A photovoltaic device 10 is carried under the frame 52 and the plurality of optical receiver 32 via a conveyor system 54. The photovoltaic device 10 moves in a direction that is substantially perpendicular to the orientation of the frame 52 such that the scribe lines 40 are oriented in substantially straight lines that are substantially parallel to the lateral side edges 53 of the photovoltaic device 10. Additionally, the conveyor system 54 is configured to move the photovoltaic device 10 at a substantially constant speed in order to ensure that the scribe lines 40 are substantially uniform in depth across the length of the scribe line 40.

FIG. 4 shows an alternative system 60 and method of forming multiple scribe lines 40 in a photovoltaic device 10. A optical receiver 32 is moveably mounted on the frame 62, which is oriented at an angle (e.g., about 10° to about 80°) in relation to the direction of travel of the photovoltaic device 10 (i.e., the device vector). During scribing, the optical receiver 32 is moved along the frame 62 such that its movement in the device vector is at substantially the same speed as the movement of the photovoltaic device 10. Thus, a scribe line 40 can be formed in the photovoltaic device 10 in a direction perpendicular to the device vector and substantially parallel to the lateral side edges 53.

Although shown utilizing rollers 56, the conveyor system 54 of FIGS. 3 and 4 can be any suitable carrying system (e.g., including a belt, track, etc.) configured to carry the photovoltaic device 10. The photovoltaic device 10 can be transported under the frame 52 with either of the film stack or the glass substrate directly exposed to the laser beam 30.

The optical receiver 32 shown in FIGS. 3 and 4 has the laser beam 30 supplied thereto via the optical waveguide 36 in contact with a vibrating element 37, as discussed with regards to FIGS. 1 and 2. As such, each optical receiver 32 can have reduced speckle in the laser intensity, leading to a more uniform scribe line depth in the thickness of the film stack, as discussed above.

Thus, the systems 50 and 60 of FIGS. 3 and 4, respectively, can form a plurality of photovoltaic cells 11 separated by the scribe lines 40 in the photovoltaic device 10.

The fiber optic laser system 29 can be particularly useful in forming scribe lines in a cadmium telluride based thin film photovoltaic device, such as shown in FIGS. 7-9. As shown, the cadmium telluride based thin-film photovoltaic device 10 includes a glass substrate 12, a TCO layer 14, a resistive transparent buffer layer 16, a cadmium sulfide layer 18, a cadmium telluride layer 20, a graphite layer 22, and a metal contact layer 24.

As stated, the photovoltaic device 10 generally includes a plurality of cells separated by scribe lines, generally formed via a laser scribing process, such as described above. For example, the laser scribing process can entail defining a first isolation scribe through the photo reactive layers (i.e., the cadmium sulfide layer 18 and the cadmium telluride layer 20) and underlying layers (i.e., through the TCO layer 14) down to the glass substrate 12. The first isolation scribe line 21 is then filled with dielectric material before application of the back contact layers in order to ensure that the TCO layer 14 is electrically isolated between cells. For example, the first isolation scribe 21 can be filled using a photoresist development process wherein a liquid negative photoresist (NPR) material is coated onto the cadmium telluride layer 20 by spraying, roll coating, screen printing, or any other suitable application process. The substrate 12 is then exposed to light from below such that the NPR material in the first isolation scribes 21 (and any pinholes in the cadmium telluride material 20) are exposed to the light, causing the exposed NPR polymers to crosslink and "harden." The substrate 12 is then "developed" in a process wherein a chemical developer is applied to the cadmium telluride layer 20 to dissolve any unhardened NPR material. In other words, the NPR material that was not exposed to the light is washed away from the cadmium telluride layer 20 by the developer, leaving the first isolation scribes 21 filled with the NPR material.

A series connecting scribe 23 can be laser cut through the graphite layer 22 to the TCO layer 14 and filled with the conductive metallic material of the metal contact layer 24 to electrically connect adjacent cells to each other in series. Of course, any conductive material can be included in the series connecting scribes 23. Specifically, the series connecting scribe 23 can allow the metal contact layer 24 to contact the TCO layer 14 providing a direct electrical connection between the back contact (i.e., the graphite layer 22 and the metal contact layer 24) and the front contact material (i.e., the TCO layer 14).

Finally, a second isolation scribe 26 can be laser cut through the back contact (i.e., the graphite layer 22 and the metal contact layer 24) and photo reactive layers (i.e., the cadmium sulfide layer 18 and the cadmium telluride layer 20) to isolate the back contact into individual cells.

The exemplary device 10 of FIGS. 7-9 includes a top sheet of glass 12 employed as the substrate. In this embodiment, the glass 12 can be referred to as a "superstrate," since it is the substrate on which the subsequent layers are formed, but it faces upwards to the radiation source (e.g., the sun) when the cadmium telluride thin film photovoltaic device 10 is in used. The top sheet of glass 12 can be a high-transmission glass (e.g., high transmission borosilicate glass), low-iron float glass, or other highly transparent glass material. The glass is generally thick enough to provide support for the subsequent film layers (e.g., from about 0.5 mm to about 10 mm thick), and is substantially flat to provide a good surface for forming the subsequent film layers. In one embodiment, the glass 12 can be a low iron float glass containing less than about 0.15% by weight iron (Fe), and may have a transmissiveness of about 0.9 or greater in the spectrum of interest (e.g., wavelengths from about 300 nm to about 900 nm).

The transparent conductive oxide (TCO) layer 14 is shown on the glass 12 of the exemplary device 10. The TCO layer 14 allows light to pass through with minimal absorption while also allowing electric current produced by the device 10 to travel sideways to opaque metal conductors (not shown). For instance, the TCO layer 14 can have a sheet resistance less than about 30 ohm per square, such as from about 4 ohm per square to about 20 ohm per square (e.g., from about 8 ohm per square to about 15 ohm per square). The TCO layer 14 generally includes at least one conductive oxide, such as tin oxide, zinc oxide, or indium tin oxide, or mixtures thereof. Additionally, the TCO layer 14 can include other conductive, transparent materials. The TCO layer 14 can also include zinc stannate and/or cadmium stannate.

The TCO layer 14 can be formed by sputtering, chemical vapor deposition, spray pyrolysis, or any other suitable deposition method. In one particular embodiment, the TCO layer 14 can be formed by sputtering, either DC sputtering or RF sputtering, on the glass 12. For example, a cadmium stannate layer can be formed by sputtering a hot-pressed target containing stoichiometric amounts of $SnO_2$ and CdO onto the glass 12 in a ratio of about 1 to about 2. The cadmium stannate can alternatively be prepared by using cadmium acetate and tin (II) chloride precursors by spray pyrolysis.

In certain embodiments, the TCO layer 14 can have a thickness between about 0.1 μm and about 1 μm, for example from about 0.1 μm to about 0.5 μm, such as from about 0.25 μm to about 0.35 μm. Suitable flat glass substrates having a TCO layer 14 formed on the superstrate surface can be purchased commercially from various glass manufactures and suppliers. For example, a particularly suitable glass 12 including a TCO layer 14 includes a glass commercially available under the name TEC 15 TCO from Pilkington North America Inc. (Toledo, Ohio), which includes a TCO layer having a sheet resistance of 15 ohms per square.

The resistive transparent buffer layer 16 (RTB layer) is shown on the TCO layer 14 on the exemplary cadmium telluride thin film photovoltaic device 10. The RTB layer 16 is generally more resistive than the TCO layer 14 and can help protect the device 10 from chemical interactions between the TCO layer 14 and the subsequent layers during processing of the device 10. For example, in certain embodiments, the RTB layer 16 can have a sheet resistance that is greater than about 1000 ohms per square, such as from about 10 kOhms per square to about 1000 MOhms per square. The RTB layer 16 can also have a wide optical bandgap (e.g., greater than about 2.5 eV, such as from about 2.7 eV to about 3.0 eV).

Without wishing to be bound by a particular theory, it is believed that the presence of the RTB layer 16 between the TCO layer 14 and the cadmium sulfide layer 18 can allow for a relatively thin cadmium sulfide layer 18 to be included in the device 10 by reducing the possibility of interface defects (i.e., "pinholes" in the cadmium sulfide layer 18) creating shunts between the TCO layer 14 and the cadmium telluride layer 22. Thus, it is believed that the RTB layer 16 allows for improved adhesion and/or interaction between the TCO layer 14 and the cadmium telluride layer 22, thereby allowing a relatively thin cadmium sulfide layer 18 to be formed thereon without significant adverse effects that would otherwise result from such a relatively thin cadmium sulfide layer 18 formed directly on the TCO layer 14.

The RTB layer 16 can include, for instance, a combination of zinc oxide (ZnO) and tin oxide ($SnO_2$), which can be referred to as a zinc tin oxide layer ("ZTO"). In one particular embodiment, the RTB layer 16 can include more tin oxide than zinc oxide. For example, the RTB layer 16 can have a composition with a stoichiometric ratio of $ZnO/SnO_2$ between about 0.25 and about 3, such as in about an one to two (1:2) stoichiometric ratio of tin oxide to zinc oxide. The RTB layer 16 can be formed by sputtering, chemical vapor deposition, spraying pryolysis, or any other suitable deposition method. In one particular embodiment, the RTB layer 16 can be formed by sputtering, either DC sputtering or RF sputtering, on the TCO layer 14. For example, the RTB layer 16 can be deposited using a DC sputtering method by applying a DC current to a metallic source material (e.g., elemental zinc, elemental tin, or a mixture thereof) and sputtering the metallic source material onto the TCO layer 14 in the presence of an oxidizing atmosphere (e.g., $O_2$ gas). When the oxidizing atmosphere includes oxygen gas (i.e., $O_2$), the atmosphere can be greater than about 95% pure oxygen, such as greater than about 99%.

In certain embodiments, the RTB layer 16 can have a thickness between about 0.075 μm and about 1 μm, for example from about 0.1 μm to about 0.5 μm. In particular embodiments, the RTB layer 16 can have a thickness between about 0.08 μm and about 0.2 μm, for example from about 0.1 μm to about 0.15 μm.

The cadmium sulfide layer 18 is shown on resistive transparent buffer layer 16 of the exemplary device 10. The cadmium sulfide layer 18 is a n-type layer that generally includes cadmium sulfide (CdS) but may also include other materials, such as zinc sulfide, cadmium zinc sulfide, etc., and mixtures thereof as well as dopants and other impurities. In one particular embodiment, the cadmium sulfide layer may include oxygen up to about 25% by atomic percentage, for example from about 5% to about 20% by atomic percentage. The cadmium sulfide layer 18 can have a wide band gap (e.g., from about 2.25 eV to about 2.5 eV, such as about 2.4 eV) in order to allow most radiation energy (e.g., solar radiation) to pass. As such, the cadmium sulfide layer 18 is considered a transparent layer on the device 10.

The cadmium sulfide layer 18 can be formed by sputtering, chemical vapor deposition, chemical bath deposition, and other suitable deposition methods. In one particular embodiment, the cadmium sulfide layer 18 can be formed by sputtering, either direct current (DC) sputtering or radio frequency (RF) sputtering, on the resistive transparent layer 16. Sputtering deposition generally involves ejecting material from a target, which is the material source, and depositing the ejected material onto the substrate to form the film. DC sputtering generally involves applying a voltage to a metal target (i.e., the cathode) positioned near the substrate (i.e., the anode) within a sputtering chamber to form a direct-current discharge. The sputtering chamber can have a reactive atmosphere (e.g., an oxygen atmosphere, nitrogen atmosphere, fluorine atmosphere) that forms a plasma field between the metal target and the substrate. The pressure of the reactive atmosphere can be between about 1 mTorr and about 20 mTorr for magnetron sputtering. When metal atoms are released from the target upon application of the voltage, the metal atoms can react with the plasma and deposit onto the surface of the substrate. For example, when the atmosphere contains oxygen, the metal atoms released from the metal target can form a metallic oxide layer on the substrate. Conversely, RF sputtering generally involves exciting a capacitive discharge by applying an alternating-current (AC) or radio-frequency (RF) signal between the target (e.g., a ceramic source material) and the substrate. The sputtering chamber can have an inert atmosphere (e.g., an argon atmosphere) having a pressure between about 1 mTorr and about 20 mTorr.

Due to the presence of the resistive transparent layer 16, the cadmium sulfide layer 18 can have a thickness that is less than about 0.1 μm, such as between about 10 nm and about 100 nm, such as from about 50 nm to about 80 nm, with a minimal presence of pinholes between the resistive transparent layer 16 and the cadmium sulfide layer 18. Additionally, a cadmium sulfide layer 18 having a thickness less than about 0.1 μm reduces any adsorption of radiation energy by the cadmium sulfide layer 18, effectively increasing the amount of radiation energy reaching the underlying cadmium telluride layer 22.

The cadmium telluride layer 20 is shown on the cadmium sulfide layer 18 in the exemplary cadmium telluride thin film photovoltaic device 10 of FIG. 1. The cadmium telluride layer 20 is a p-type layer that generally includes cadmium telluride (CdTe) but may also include other materials. As the p-type layer of device 10, the cadmium telluride layer 20 is the photovoltaic layer that interacts with the cadmium sulfide layer 18 (i.e., the n-type layer) to produce current from the adsorption of radiation energy by absorbing the majority of the radiation energy passing into the device 10 due to its high absorption coefficient and creating electron-hole pairs. For example, the cadmium telluride layer 20 can generally be formed from cadmium telluride and can have a bandgap tailored to absorb radiation energy (e.g., from about 1.4 eV to about 1.5 eV, such as about 1.45 eV) to create the maximum number of electron-hole pairs with the highest electrical potential (voltage) upon absorption of the radiation energy. Electrons may travel from the p-type side (i.e., the cadmium telluride layer 20) across the junction to the n-type side (i.e., the cadmium sulfide layer 18) and, conversely, holes may pass from the n-type side to the p-type side. Thus, the p-n junction formed between the cadmium sulfide layer 18 and the cadmium telluride layer 20 forms a diode in which the charge imbalance leads to the creation of an electric field spanning the p-n junction. Conventional current is allowed to flow in only one direction and separates the light induced electron-hole pairs.

The cadmium telluride layer 20 can be formed by any known process, such as vapor transport deposition, chemical vapor deposition (CVD), spray pyrolysis, electro-deposition, sputtering, close-space sublimation (CSS), etc. In one particular embodiment, the cadmium sulfide layer 18 is deposited by a sputtering and the cadmium telluride layer 20 is deposited by close-space sublimation. In particular embodiments, the cadmium telluride layer 20 can have a thickness between about 0.1 μm and about 10 μm, such as from about 1 μm and about 5 μm. In one particular embodiment, the cadmium telluride layer 20 can have a thickness between about 2 μm and about 4 μm, such as about 3 μm.

A series of post-forming treatments can be applied to the exposed surface of the cadmium telluride layer 20. These treatments can tailor the functionality of the cadmium telluride layer 20 and prepare its surface for subsequent adhesion to the back contact layers 22 and 24. For example, the cadmium telluride layer 20 can be annealed at elevated temperatures (e.g., from about 350° C. to about 500° C., such as from about 375° C. to about 424° C.) for a sufficient time (e.g., from about 1 to about 10 minutes) to create a quality p-type layer of cadmium telluride. Without wishing to be bound by theory, it is believed that annealing the cadmium telluride layer 20 (and the device 10) converts the normally n-type cadmium telluride layer 20 to a p-type cadmium telluride layer 20 having a relatively low resistivity. Additionally, the cadmium telluride layer 20 can recrystallize and undergo grain growth during annealing.

Annealing the cadmium telluride layer 20 can be carried out in the presence of cadmium chloride in order to dope the cadmium telluride layer 20 with chloride ions. For example, the cadmium telluride layer 20 can be washed with an aqueous solution containing cadmium chloride then annealed at the elevated temperature.

In one particular embodiment, after annealing the cadmium telluride layer 20 in the presence of cadmium chloride, the surface can be washed to remove any cadmium oxide formed on the surface. This surface preparation can leave a Te-rich surface on the cadmium telluride layer 20 by removing oxides from the surface, such as CdO, $CdTeO_3$, $CdTe_2O_5$, etc. For instance, the surface can be washed with a suitable solvent (e.g., ethylenediamine also known as 1,2 diaminoethane or "DAE") to remove any cadmium oxide from the surface.

Additionally, copper can be added to the cadmium telluride layer 20. Along with a suitable etch, the addition of copper to the cadmium telluride layer 20 can form a surface of copper-telluride on the cadmium telluride layer 20 in order to obtain a low-resistance electrical contact between the cadmium telluride layer 20 (i.e., the p-type layer) and the back contact layer(s). Specifically, the addition of copper can create a surface layer of cuprous telluride ($Cu_2Te$) between the cadmium telluride layer 20 and the back contact layer 22. Thus, the Te-rich surface of the cadmium telluride layer 20 can enhance the collection of current created by the device through lower resistivity between the cadmium telluride layer 20 and the back contact layer 22.

Copper can be applied to the exposed surface of the cadmium telluride layer 20 by any process. For example, copper can be sprayed or washed on the surface of the cadmium telluride layer 20 in a solution with a suitable solvent (e.g., methanol, water, or the like, or combinations thereof) followed by annealing. In particular embodiments, the copper may be supplied in the solution in the form of copper chloride, copper iodide, or copper acetate. The annealing temperature is sufficient to allow diffusion of the copper ions into the cadmium telluride layer 20, such as from about 125° C. to about 300° C. (e.g. from about 150° C. to about 200° C.) for about 5 minutes to about 30 minutes, such as from about 10 to about 25 minutes.

The back contact is formed from the graphite layer 22 and the metal contact layer 22 shown on the cadmium telluride layer 20 and generally serves as the back electrical contact, in relation to the opposite, TCO layer 14 serving as the front electrical contact. The back contact is formed on, and in one embodiment is in direct contact with, the cadmium telluride layer 20.

The graphite layer 22 can include a polymer blend or a carbon paste and can be applied to the semiconductor device by any suitable method for spreading the blend or paste, such as screen printing, spraying or by a "doctor" blade. After the application of the graphite blend or carbon paste, the device 10 can be heated to convert the blend or paste into the conductive graphite layer 22. The graphite layer 22 can be, in particular embodiments, from about 0.1 μm to about 10 μm in thickness, for example from about 1 μm to about 5 μm.

The metal contact layer 24 is suitably made from one or more highly conductive materials, such as elemental nickel, chromium, copper, tin, aluminum, gold, silver, technetium or alloys or mixtures thereof. The metal contact layer 24, if made of or comprising one or more metals, is suitably applied by a technique such as sputtering or metal evaporation. The metal contact layer 24 can be from about 0.1 μm to about 1.5 μm in thickness.

Other components (not shown) can be included in the exemplary device 10, such as buss bars, external wiring, laser etches, etc. For example, when the device 10 forms a photovoltaic cell of a photovoltaic module, a plurality of photovoltaic cells can be connected in series in order to achieve a desired voltage, such as through an electrical wiring connection. Each end of the series connected cells can be attached to a suitable conductor such as a wire or bus bar, to direct the photovoltaically generated current to convenient locations for connection to a device or other system using the generated electric. A convenient means for achieving such series connections is to laser scribe the device to divide the device into a series of cells connected by interconnects. In one particular embodiment, for instance, a laser can be used to scribe the deposited layers of the semiconductor device to divide the device into a plurality of series connected cells, as described above with respect to FIG. 8.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of reducing speckle of a laser beam from a laser source guided through an optical waveguide, the method comprising:
   vibrating the optical waveguide at a first point along the optical waveguide at a first frequency of about 20 kHz to about 20 GHz;
   vibrating the optical waveguide at a second point along the optical waveguide at a second frequency of about 20 kHz to about 20 GHz; and,
   directing the laser beam from the laser source through the optical waveguide to a target.

2. The method as in claim 1, wherein the optical waveguide is vibrated a distance of about 0.1 mm to about 5 cm.

3. The method as in claim 1, wherein the optical waveguide is vibrated using an ultrasonic vibrator.

4. The method as in claim 1, wherein the optical waveguide is wrapped around a vibrating element such that the first point is attached to the vibrating element.

5. The method as in claim 1, further comprising:
   scribing a thin film using the laser beam.

6. The method as in claim 1, wherein the second frequency is different than the first frequency.

7. The method as in claim 6, further comprising:
   vibrating the optical waveguide at a third point along the optical waveguide at a third frequency of about 20 kHz to about 20 GHz.

8. The method as in claim 7, wherein the third frequency is different than both the first frequency and the second frequency.

9. A method of scribing a thin film layer on a photovoltaic module, the method comprising:
   vibrating an optical waveguide at a first point along the optical waveguide at a first frequency of about 20 kHz to about 20 GHz;
   vibrating the optical waveguide at a second point along the optical waveguide at a second frequency of about 20 kHz to about 20 GHz, wherein the second frequency is different than the first frequency;
   focusing a laser beam out of the optical waveguide from a laser source onto the thin film layer of the photovoltaic module; and,
   scribing the thin film layer using the laser beam to form a scribe line on the photovoltaic module.

10. The method as in claim 9, wherein the scribe line has a scribe depth having a variation of about 10% or less.

11. The method as in claim 9, wherein the optical waveguide is vibrated a distance of about 0.1 mm to about 5 cm.

12. The method as in claim 9, further comprising:
    vibrating the optical waveguide at a third point along the optical waveguide at a third frequency of about 20 kHz to about 20 GHz, wherein the third frequency is different than both the first frequency and the second frequency.

13. The method as in claim 9, wherein the optical waveguide is wrapped around a vibrating element such that the first point is attached to the vibrating element.

14. The method as in claim 13, wherein the optical waveguide is wrapped around a second vibrating element such that a second point attached to the second vibrating element is vibrated at a second frequency of about 20 kHz to about 20 GHz, wherein the second frequency is different than the first frequency.

15. A fiber optic laser system for reducing speckle of a laser beam from a laser source guided through an optical waveguide, comprising:
    a laser transmitter;
    an optical waveguide operably attached to the laser transmitter;
    a first vibrating element attached to a first point of the optical waveguide, wherein the vibrating element is configured to vibrate at a first frequency of about 20 kHz to about 20 GHz;
    a second vibrating element attached to a second point of the optical waveguide, wherein the second vibrating element is configured to vibrate at a second frequency of about 20 kHz to about 20 GHz, wherein the second frequency is different than the first frequency;
    an optical receiver operably attached to the optical waveguide; and,
    a lens operably attached to the optical receiver, wherein the lens configured to focus a laser beam onto a target.

16. The apparatus as in claim 15, wherein the optical waveguide is wrapped around the first vibrating element.

17. The apparatus as in claim 15, wherein a plurality of vibrating elements are attached to the optical waveguide.

* * * * *